United States Patent [19]

Kuromitsu

[11] 3,979,912
[45] Sept. 14, 1976

[54] BRAKE BOOSTER UTILIZING A PUMP OF A POWER STEERING DEVICE

[75] Inventor: Hiromu Kuromitsu, Toyota, Japan

[73] Assignee: Aisin Seiki Kabushiki Kaisha, Japan

[22] Filed: Apr. 30, 1975

[21] Appl. No.: 572,942

[30] Foreign Application Priority Data
May 16, 1974 Japan.............................. 49-54730

[52] U.S. Cl. ................................ 60/547; 91/373; 91/412; 91/391 R
[51] Int. Cl.² .......................................... F15B 7/00
[58] Field of Search ............ 60/386, 400, 403, 405, 60/420, 547, 582; 91/373, 412, 391 R; 137/101

[56] References Cited
UNITED STATES PATENTS

| 2,737,196 | 3/1956 | Eames............................. 91/412 X |
| 3,662,548 | 5/1972 | Suzuki et al. .................... 91/412 X |
| 3,747,473 | 7/1973 | Bach et al. ...................... 91/417 R X |

Primary Examiner—Edgar W. Geoghegan
Attorney, Agent, or Firm—Oblon, Fisher, Spivak, McClelland & Maier

[57] ABSTRACT

A brake booster utilizing a pump of a power steering device includes a source of fluid pressure, a cylinder, a power piston slidably disposed within the cylinder, a manual piston also slidably disposed within the cylinder, an actuating chamber formed between the power piston and the manual piston and controlled by the manual piston, a valve member slidably disposed within the power piston and provided with a first valve cooperative with the power piston and a second valve cooperative with the manual piston, and a flow divider valve interposed between the pump and the power steering device for dividing the hydraulic fluid flow from the pump into the actuating chamber and the power steering device so as to thereby control the hydraulic fluid within the actuating chamber, in accordance with the actuation of the manual piston, by means of the first and second valves of the valve member.

7 Claims, 2 Drawing Figures

BRAKE BOOSTER UTILIZING A PUMP OF A POWER STEERING DEVICE

BACKGROUND OF THE INVENTION

1. Field of the Invention

The present invention relates generally to a brake booster, and more particularly to a brake booster utilizing a pump of a power steering device.

2. Description of the Prior Art

Conventionally, a valve spool is disposed within a power piston and an actuating chamber of the power piston is cut off from a drain port as a result of the movement of the valve spool in accordance with the depression force of a brake pedal. The actuating chamber of the power piston is then fluidically connected to an inlet port and the fluid flow from the inlet port to an outlet port is compressed and limited and the hydraulic fluid pressure within the actuating chamber is thereby increased. Within this system, a passage disposed upon the outer peripheral surface of the power piston is formed into an annular configuration so as to easily construct a brake booster mechanism, however, the booster will inevitably be elongated. In addition, a passage disposed upon the outer peripheral surface of the power piston may be axially formed so as to shorten the brake booster, however, it will be difficult to form the axial passage, and a groove for balancing the pressure force must be further formed due to the fact that the power piston is contacted with a cylinder wall as a result of the pressure force within the passage.

Within another type of system, a valve spool is outwardly disposed and a power piston is provided in parallel with the valve spool, the valve spool being mechanically cooperative with a brake pedal through means of a lever. Within this system, it is easy to form a passage upon the outer peripheral surface of the power piston, and in addition, the brake booster can be shortened, however, the lever, and an attaching mechanism therefor, are necessary.

SUMMARY OF THE INVENTION

Accordingly, it is an object of the present invention to provide a brake booster for obviating the aforenoted conventional drawbacks.

Another object of the present invention is to provide an improved and highly simplified brake booster system.

BRIEF DESCRIPTION OF THE DRAWINGS

Various other objects, features and attendant advantages of the present invention will be more fully appreciated as the same becomes better understood by reference to the following detailed description when considered in connection with the accompanying drawings within which like reference characters designate corresponding parts throughout the several views and wherein.

DETAILED DESCRIPTION OF THE PREFERRED EMBODIMENTS

Figure 1:
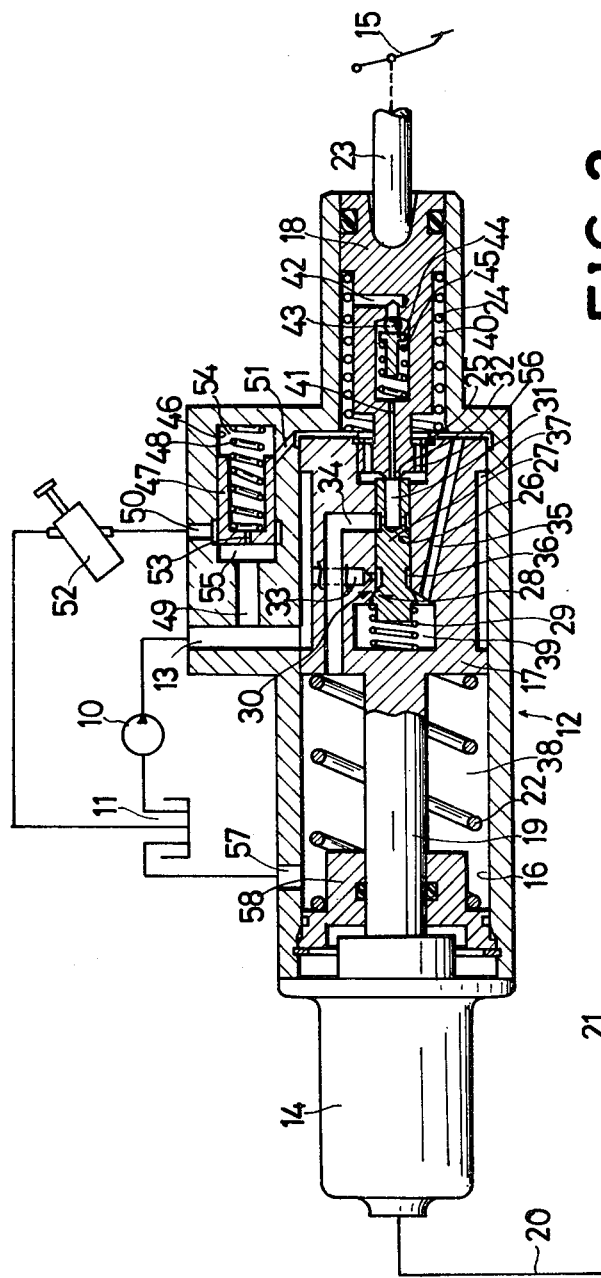
FIG. 1 is a schematic view, partially in cross-section, of a brake booster system constructed in accordance with the present invention and showing its cooperative parts; and, FIG. 2 is a cross-sectional view of another embodiment of one of the piston-cylinder elements of the brake booster of the embodiment of FIG. 1.

Referring now to the drawings, and more particularly to FIG. 1 thereof, a pump 10 is driven by means of an engine of the vehicle, not shown, and supplies hydraulic fluid from a reservoir 11 to an inlet port 13 of a brake booster, generally indicated by the reference character 12. The brake booster 12 is operatively connected with a master cylinder 14 at the one end thereof and with a brake pedal 15 at the other end thereof, and is provided with a stepped bore 16 within which a power piston 17 and a manual piston 18 are slidably disposed.

The power piston 17 is operatively mechanically connected with the master cylinder 14 through means of a rod 19, and the master cylinder 14 is in turn fluidically connected with a wheel brake cylinder 21 by means of a conduit 20. The power piston 17 is maintained at the position disclosed within FIG. 1 by means of a spring 22, disposed within a chamber 38 accommodating the rod 19 of the power piston 17 and interposed between piston 17 and a guide member 58 of rod 19, under the non-actuated state of the brake booster 12. One end of the manual piston 18 is operatively connected with the brake pedal 15 through means of a manual rod 23 while the other end thereof is slidably disposed within the power piston 17. When the brake pedal 15 is not depressed, the manual piston 18 contacts a stopper 25 by a means of the biasing force of spring 24, disposed within an actuating chamber 40 defined between piston 18 and booster 12, which is weaker than the spring 22 disposed within chamber 38.

A cylinder 26 is formed within the power piston 17 and a valve member 27 is slidably disposed within the cylinder 26, a valve portion 28 of valve member 27 being seated upon a seat portion 30 of power piston 17 under the biasing force of a spring 29 disposed within a chamber 39 provided within the left end of power piston 17. An axial passage 31 is formed within the right end of valve member 27 and is opened by means of the spring 24 biasing the piston 18 and a valve portion 32, provided upon the left end of manual piston 18, toward the right as seen in FIG. 1.

The power piston 17 is provided with three passages 33, 34 and 35, and the radial passage 33 connects an annular chamber 36, defined between the outer peripheral surface of the valve portion 28 of valve member 27 and the cylinder 26, with an outer peripheral annular groove 37 of power piston 17 the latter of which is in turn fluidically connected to the inlet port 13. The passage 34 similarly connects the axial passage 31 with the chamber 38, and the passage 35 likewise connects the chamber 39 within power piston 17 with the actuating chamber 40. An axial passage 41 is also formed within the tubular manual piston 18 and a radial passage 42, fluidically connected to chamber 40, is also formed within the manual piston 18, chamber 42 being closed by means of a ball 43 normally biased through means of a retainer 44 and a spring 45.

The brake booster 12 is further provided with a cylinder 46, and a valve piston 47, slidably disposed within the cylinder 46, is biased toward the left by means of a spring 48. The cylinder 46 is also provided with three passages 49, 50, and 51 and the axial passage 49 communicates with a left end chamber 55 formed within cylinder 46 as well as with the inlet port 13. The radial passage 50 is fluidically connected with a power steering device 52, and the passage 51 communicates with a right end chamber 54 formed within cylinder 46 as well as with the actuating chamber 40. The valve piston 47 is provided with an orifice 53, and the chambers 54 and 55 communicate through means of the orifice 53, and in this manner, a certain quantity of hydraulic fluid may be supplied from chamber 55 to the passage 51 through means of the chamber 54, the orifice 53 acting as a flow divider.

When the hydraulic fluid from the pump 10 is supplied to the chamber 55 through means of the inlet port 13 and the passage 49, the valve piston 47 is moved toward the right against the biasing force of the spring 48, and consequently, a pressure difference occurs between the chambers 54 and 55. As a result of this pressure difference between the chambers 54 and 55, the quantity of hydraulic fluid conducted through the orifice 53 attains a predetermined value and the remainder of the hydraulic fluid is transmitted to the power steering device 52 through means of the chamber 55 and the passage 50 to be subsequently returned to the reservoir 11.

The hydraulic fluid conducted through the orifice 53 is transmitted to the chamber 38 through means of the chamber 54, the passage 51, chamber 40, an axial passage 56 provided within the manual piston 18, the passage 31 of the valve member 27, and the passage 34 of the power piston 17, such fluid also being subsequently returned to the reservoir 11 through means of the chamber 38 and the port 57. At this time, the quantity of hydraulic fluid conducted through the orifice 53 is small and the pressure of the hydraulic fluid returned to the reservoir 11 is substantially zero.

The operation of the brake booster disclosed within FIG. 1 will now be described hereinbelow in detail:

When the brake pedal 15 is depressed, the manual piston 18 is moved toward the left through means of the rod 23 and the hydraulic fluid flow through the passage 56 of the manual piston 18 to the passage 31 of the valve member 27 is limited as a result of the leftward movement of the valve portion 32 of the manual piston 18. Accordingly, the hydraulic fluid pressure within chamber 40 is increased as a result of the limited hydraulic fluid flow through the passage 56 of the manual piston 18 to the passage 31 of the valve member 27, and consequently, the valve piston 47 is moved toward the left as a result of the increased pressure within chamber 54 as transmitted through the passage 51. Therefore, the hydraulic fluid conducted from the pump 10, through the passage 49, to the power steering device 52 is limited by means of the left end portion of the valve piston 47, while the hydraulic fluid conducted from the pump 10 to the annular groove 36 through means of the inlet port 13, the groove 37, and the passage 33 is increased.

At this time, the reaction force is transmitted to the vehicle driver by means of the pressure within chamber 40 acting upon the manual piston 18, and simultaneously therewith, the fluid pressure within chamber 40 also acts upon the right end portion of power piston 17 whereby the latter is moved toward the left whereby the master cylinder 14 is actuated by means of such leftward movement of the power piston 17 through means of the rod 19. Consequently, the fluid pressure is supplied to the wheel brake cylinder 21 through means of the conduit 20 and the brake actuation is attained.

At this time, the manual piston 18 is moved toward the left along with the power piston 17 and the pressure within chamber 40 acts upon the ball 43 through means of the passage 42 of the manual piston 18 and when the pressure within chamber 40 reaches a predetermined value, the ball 43, normally urged toward the right by the spring 45, is unseated and the fluid pressure from chamber 40 is able to be transmitted to the passage 31 through means of the passages 42 and 41. The pressure within chamber 40, as well as chamber 54 which is connected to chamber 40 through means of passage 51, is not increased above the predetermined value and the hydraulic fluid discharged from the pump 10 is transmitted to the power steering device 52 through means of the port 13, passage 49, chamber 55 and the passage 50. The power piston 17 is moved toward the left by the pressure generated within chamber 40, as noted heretofore, however, when the power piston 17 is so moved, the manual piston 18 is integrally moved with the power piston 17 while the pressure within chamber 40 is regulated by means of piston 18.

When the brake pedal 15 is released, the manual piston 18 is returned until the same contacts the stopper 25 as a result of the pressure within chamber 40 and the biasing force of spring 24. The valve portion 32 of the manual piston 18 is released from the limiting position with respect to the valve member 27 as a result of the rightward movement of manual piston 18, and since the pressure within chamber 40 is drained to the reservoir 11 through means of passage 56 of manual piston 18, the passage 31 of the valve member 27, the passage 34 of the power piston 17, chamber 38, and the port 57, the pressure within chamber 40 consequently becomes zero. At this time, the power piston 17 is returned to the state shown in FIG. 1 by means of the rightward biasing force of spring 22 and therefore, the braking actuation is released.

When the pressure within chamber 40 cannot be increased by the quantity of hydraulic fluid being conducted through the orifice 53, such as for example, when the brake pedal 15 is quickly depressed, the passage 31 is completely interrupted by the leftward movement of the valve portion 32 of piston 18, the valve member 27 is moved toward the left by means of such leftward movement of the manual piston 18 and then the valve portion 28 of the valve member 27 is released from the seat portion 30 of the power piston 17, and consequently, the chambers 54 and 55 are in communication with each other through means of the inlet port 13, the passage 33, chamber 39, passage 35, chamber 40, and the passage 51.

Accordingly, the pressure difference between the chambers 54 and 55 becomes equal, however, the valve piston 47 is moved toward the left as a result of the biasing force of the spring 48 and consequently the hydraulic fluid to the passage 50 is limited by the leftward movement of the valve piston 47. As a result, the pressure within chamber 40 is increased as a result of the application of pressure by piston 47 to the hydraulic fluid being conducted from the inlet port 13 to the passage 35 and communicated to the chamber 40 through means of the groove 37 of the power piston 17, the passage 33, and the chamber 39.

In other words, the increase in the fluid pressure, as a result of the interruption of the fluid communication between the passage 31 of the valve member 27 and the passage 56 of the manual piston 18 in response to the rapid depression of the brake pedal 15, is further increased by the application of the hydraulic fluid from the inlet port 13 to the passage 35 to be conducted to the chamber 40 through means of the passage 37 to the power piston 17, passage 33, and the chamber 39. As a result of such fluid flow, the power piston 17 is moved toward the left and the master cylinder 14 is quickly actuated through means of the rod 19, and consequently, the wheel brake cylinder 21 will be quickly operated and the braking operation quickly obtained. When the pressure within chamber 40 becomes the control pressure, the valve portion 28 of the valve member 27 is again seated upon the seat portion 30 of the power piston 17, and thereafter, as a result of the leftward movement of the valve portion 32 of the manual piston 18, the pressure within chamber 40 is controlled.

When the power steering device 52 is operated, the hydraulic fluid pressure supplied from the pump 10 to the port 50 through means of the passage 49 and the chamber 55 is increased and the valve piston 47 is moved toward the right as a result of such increased pressure within the chamber 55 and therefore, the passage 51 is blocked by the rightward movement of the valve piston 47 and the regulated fluid pressure will be supplied to the power steering device 52.

When the pump 10 cannot discharge the hydraulic fluid, that is, if the pump 10 should become damaged, the manual piston 18 is contacted with the power piston 17, as a result of the depression of the brake pedal 15, the motion being transmitted through means of the rod 23, and consequently, the pressure of the hydraulic fluid of the master cylinder 14 is increased and the increased fluid pressure is applied to the wheel brake cylinder 21 through means of the conduit 20. Therefore, a normal braking operation is attained.

Figure 2:

Referring now to FIG. 2, it is seen that within this embodiment, the orifice 53 of piston 47 has been omitted. It is also seen that the hydraulic fluid conducted from the actuating chamber 40 to the passage 31 of the valve member 27 is not able to be conducted thereto under non-actuating conditions of the brake booster 12, whereupon the brake pedal 15 being depressed, the manual piston 18 is moved toward the left and as a result of such leftward movement of the valve portion 32 of the manual piston 18, the passage 31 of the valve member 27 is completely closed and the valve member 27 is also moved toward the left.

Accordingly, the valve portion 28 of the valve member 27 is released from the seat portion 30 of the power piston 17 in accordance with the leftward movement of the valve member 27 and the actuating chamber 40 is thus communicated with the inlet port 13 through means of the groove 37, passage 33, chamber 39, and passage 35. Consequently, the pressure within the chambers 54 and 55 becomes equal and the hydraulic fluid conducted from the passage 49 to the passage 50 is compressed by means of the valve piston 47 whereby the pressure within the actuating chamber 40 is increased and the power piston 17 is moved toward the left by the fluid pressure within chamber 40. Consequently, the master cylinder 14 is actuated by means of the leftward movement of the power piston 17 as transmitted through means of the rod 19 whereby the fluid pressure is applied from the master cylinder 14 to the wheel brake cylinder 21 through means of the conduit 20, the braking operation therefore being attained.

Obviously, many modifications and variations of the present invention are possible in light of the above teachings. It is to be understood therefore that within the scope of the appended claims the invention may be practiced otherwise than as specifically described herein.

What is claimed as new and desired to be secured by Letters Patent of the United States is:

1. A brake booster utilizing a pump of a power steering device comprising:
    a reservoir;
    a source of fluid pressure;
    a brake pedal to be actuated by means of a vehicle driver;
    wheel brake cylinders;
    said brake booster including a stepped cylinder, a power piston slidably disposed within said cylinder, a manual piston slidably disposed within said cylinder and operated by means of said brake pedal, an actuating chamber defined between said power piston and said manual piston and acting upon said power piston in accordance with the actuation of said manual piston, a valve member slidably disposed within said power piston and provided with a first valve cooperative with said power piston according to the movement of said manual piston for controlling the communication between an inlet port and said actuating chamber and a second valve cooperative with said manual piston for controlling the communication between an outlet port and said actuating chamber, said inlet port being directly fluidically connected to said pump and directly communicable with said first valve of said valve member, said outlet port being fluidically connected to said reservoir, a flow divider valve interposed between said inlet port and said power steering device for dividing the hydraulic fluid flow from said pump into said actuating chamber and to said power steering; and
    a master cylinder operatively connected with said power piston for supplying the fluid pressure to said wheel brake cylinders,
    thereby controlling the hydraulic fluid within said actuating chamber in accordance with said brake pedal by means of said first and second valves of said valve member.

2. A brake booster utilizing a pump of a power steering device as set forth in claim 1, wherein said flow divider valve comprises:
    a cylinder;
    a valve piston slidably disposed within said cylinder and provided with an orifice for supplying the hydraulic fluid from said pump to said actuating chamber; and
    a spring for biasing said valve piston in a direction so as to limit the hydraulic fluid flow from said pump to said power steering device.

3. A brake booster utilizing a pump of a power steering device as set forth in claim 1, wherein said flow divider valve comprises:
    a cylinder;
    a valve piston slidably disposed within said cylinder; and
    a spring for biasing said valve piston in a direction so as to limit the hydraulic fluid flow from said pump to said power steering device.

4. A brake booster utilizing a pump of a power steering device as set forth in claim 1, wherein:
    said power piston includes a chamber controlled by said first valve, and a passage permitting communication between said chamber of said power piston and said actuatng chamber.

5. A brake booster utilizing a pump of a power steering device as set forth in claim 1, wherein:
said valve member is further provided with a passage fluidically connected to said source of fluid pressure.

6. A brake booster utilizing a pump of a power steering device as set forth in claim 1, wherein said second valve of said valve member controls the hydraulic fluid within said actuating chamber.

7. A brake booster utilizing a pump of a power steering device as set forth in claim 1, wherein:
said second valve of said valve member controls the hydraulic fluid to said actuating chamber.

* * * * *